US010411802B2

(12) United States Patent
Tanaka et al.

(10) Patent No.: US 10,411,802 B2
(45) Date of Patent: Sep. 10, 2019

(54) OPTICAL COMMUNICATION DEVICE, OPTICAL COMMUNICATION SYSTEM, AND OPTICAL COMMUNICATION METHOD

(71) Applicant: NEC CORPORATION, Tokyo (JP)

(72) Inventors: Akihiro Tanaka, Tokyo (JP); Toshiharu Ito, Tokyo (JP); Kohei Hosokawa, Tokyo (JP); Seigo Takahashi, Tokyo (JP); Manabu Arikawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/745,254

(22) PCT Filed: Jul. 15, 2016

(86) PCT No.: PCT/JP2016/003343
§ 371 (c)(1),
(2) Date: Jan. 16, 2018

(87) PCT Pub. No.: WO2017/013864
PCT Pub. Date: Jan. 26, 2017

(65) Prior Publication Data
US 2018/0212681 A1 Jul. 26, 2018

(30) Foreign Application Priority Data

Jul. 17, 2015 (JP) .................. 2015-142769

(51) Int. Cl.
*H04B 10/00* (2013.01)
*H04B 10/40* (2013.01)
(Continued)

(52) U.S. Cl.
CPC ......... *H04B 10/118* (2013.01); *H04B 10/112* (2013.01); *H04B 10/12* (2013.01);
(Continued)

(58) Field of Classification Search
None
See application file for complete search history.

(56) References Cited

U.S. PATENT DOCUMENTS 6,583,901 B1 * 6/2003 Hung ............... H04J 14/02
398/100
7,023,601 B2 4/2006 McGhan et al.
(Continued)

FOREIGN PATENT DOCUMENTS

JP 2003-531515 A 10/2003
JP 4701454 B2 6/2011
(Continued)

OTHER PUBLICATIONS

Leon-Saval, "mode-selective photonic lanterns for space division multiplexing", 2014, OSA, vol. 24, No. 1 (Year: 2014).*
(Continued)

*Primary Examiner* — Darren E Wolf
(74) *Attorney, Agent, or Firm* — Sughrue Mion, PLLC (57) ABSTRACT

A receiving-side splitter 4 that constitutes part of an optical communication device 1 splits a receiving-side signal light into a plurality of lights at a splitting ratio according to the intensity distribution of mutually different propagation modes included in the receiving-side signal light passed through a transmission medium 3. A transmission-side splitter 10 splits a transmission-side signal light into a plurality of-lights. A signal processing device 5 detects the light intensity and/or the phase of the receiving-side signal light, and sets a control target value for the light intensity and/or the phase of the transmission-side signal light to a value according to the result of the detection. A modulator 9 adjusts the light intensity or the phase of a the transmission-side signal light so that the light intensity or phase equals the set value. A multiplexer 8 multiplexes the plurality of transmission-side signal lights.

8 Claims, 6 Drawing Sheets

(51) Int. Cl.
   *H04B 10/50* (2013.01)
   *H04B 10/60* (2013.01)
   *H04B 10/112* (2013.01)
   *H04B 10/118* (2013.01)

(52) U.S. Cl.
   CPC .............. *H04B 10/40* (2013.01); *H04B 10/50* (2013.01); *H04B 10/60* (2013.01)

(56) References Cited

U.S. PATENT DOCUMENTS

2001/0035995 A1* 11/2001 Ruggiero ........... H04B 10/1121 398/118
2005/0259991 A1* 11/2005 Dudelzak ................ G01S 3/782 398/118

FOREIGN PATENT DOCUMENTS

JP 2013-535871 A 9/2013
WO 03/079582 A1 9/2003

OTHER PUBLICATIONS

Labroille, "Efficient and mode selective spatial mode multiplexer based on multi place light conversion", 2014, OSA, vol. 22, No. 13 (Year: 2014).*

"Next-generation Extremely Large Optical Infrared Telescope Planning Instructions," TMT-J Project Office, National Astronomical Observatory of Japan, Jul. 2012.

Sergio G. Leon-Saval et al., "Mode-selective photonic lanterns for space-division multiplexing", Optics Express, Jan. 13, 2014, pp. 1-9, 22, vol. 22, No. 1.

Guillaume Labroille et al., "Efficient and mode selective spatial mode multiplexer based on multi-plane light conversion", arXiv:1404. 6455 (2014).

Takahashi et al., "A Study of an SDM-type Optical Space Receiver (1) An improvement of Coupling Efficiency by FMF", The Institute of Electronics, Information and Communication Engineers General Conference 2015, B-3-23 (2015).

Toyoshima et al., "Laser Beam Atmospheric Propagation Characteristics in an Optical Communication Channel between the Ground and a Low Orbit Satellite", IEICE Transactions on Communications B, vol. J94-B, No. 3, p. 409 (2011).

Yongmin Jung et al., "Reconfigurable Modal Gain Control of a Few-Mode EDFA supporting Six Spatial Modes", IEEE Photonics Technology Letters, Jun. 1, 2014, pp. 1100-1103, vol. 26, No. 11.

R. G. Lane et al., "Wave-front reconstruction using a Shack-Hartmann sensor", Applied Optics, Nov. 10, 1992, pp. 6902-6908, vol. 31, No. 32.

Kohei Hosokawa et al., A Study on an SDM-type Optical Space Receiver (2): A Demodulation Technique by DSP Synthesis of Multimode Signal Light, Proceedings of the IEICE General Conference, Feb. 24, 2015, Communication (1), 2015, p. 276.

International Search Report for PCT/JP2016/003343, dated Aug. 23, 2016.

* cited by examiner

OPTICAL COMMUNICATION DEVICE, OPTICAL COMMUNICATION SYSTEM, AND OPTICAL COMMUNICATION METHOD

CROSS REFERENCE TO RELATED APPLICATIONS

This application is a National Stage of International Application No. PCT/JP2016/003343 filed Jul. 15, 2016, claiming priority based on Japanese Patent Application No. 2015-142769 filed Jul. 17, 2015, the contents of all of which are incorporated herein by reference in their entirety.

TECHNICAL FIELD

The present invention relates to a technique of wireless communication using a signal light.

BACKGROUND ART

In recent years, movements of construction of a wireless communication network using a flying object such as a satellite and a balloon have been active. The wireless communication network using a flying object has an advantage that, in comparison with a communication network constructed on a surface of the ground, a base station is unlikely to encounter a disaster, for example, by constructing the base station on a flying object, and thereby disaster-resistant property is improved. Further, the wireless communication network using a flying object also has an advantage that a cost for construction such as installation of wiring facilities can be reduced. It is predicted that users of such a wireless communication network using a flying object increase, and with an increase of the users, it is supposed that frequency bands of radio waves used in the wireless communication network are tight. Therefore, as wireless communication used in the wireless communication network using a flying object, attention is paid to free space optics (FSO) using an optical frequency band expected to become markedly broadband, instead of microwaves that are currently mainstream.

In order to achieve a large-capacity free space optics system, a speeding-up technique of a bit rate of a transmission signal light and a wavelength division multiplexing technique are required. Further, in a free space optics system, since a signal light is propagated for a long distance between a flying object in midair and the ground, attenuation of the signal light during the propagation is large, and therefore a high-sensitive reception device is required. For the reception device, a technique common to an optical fiber communication technique, specifically, an optical transmission/reception technique using a single mode fiber (SMF) is applied. The reason why the single mode fiber is used in a free space optics system is that an optical transmission/reception technique such as a low-noise and high-gain direct optical amplification technique, a high-sensitive digital coherent reception technique, a high bit-rate transmission/reception technique, and a dense wavelength division multiplexing (DWDM) technique can be used.

In a free space optics system using a single mode fiber, it is necessary for a signal light (laser light) propagated in a free space to enter (be coupled with) a core having a small core diameter in the single mode fiber. Therefore, in a free space optics system between a flying object in midair such as an artificial satellite, and a ground station, in order to condense sufficient optical power, a reception device needs to include a telescope having a large aperture diameter.

Herein, an aperture of the telescope is equal to or more than several times a spatial coherence radius of a signal light (laser light) propagated in the atmosphere, and therefore the signal light is likely to be affected by turbulence of the atmosphere such as wind. In other words, when passing through a portion where a local fluctuation of a refractive index of the atmosphere caused by a turbulence phenomenon and a thermal phenomenon occurs, a signal light is refracted and the signal light is deflected due to the refraction. Therefore, a disturbance of a beam spot of a signal light condensed by a telescope increases. In this manner, an intensity of a signal light that enters a reception device largely varies due to a disturbance of a beam spot, and therefore, in a free space optics system, a problem that stable communication is difficult occurs. In particular, when a large attenuation (fade) of a signal light due to a large intensity variation occurs, an error or lack of reception data is caused. Therefore, in a free space optics system, a problem that an overhead of forward error correction (FEC) increases and a problem that retransmission processing becomes necessary occur. Such problems cause a decrease in an effective throughput of a free space optics system.

As described above, in a free space optics system, due to a disturbance of a wave-front to which a signal light is subjected during atmospheric propagation, a problem that communication becomes unstable may occur. A large number of techniques for solving such the problem have been proposed heretofore.

A reception device disclosed in PTL 1 (Japanese Translation of PCT International Application Publication No. 2013-535871) includes a light condensing unit, a wavelength demultiplexer, a plurality of optical detectors, and a signal processing unit. The reception device is configured to collect light on a plurality of individual fiber end faces from the wavelength demultiplexer and converge a signal light to a single output fiber to be input to the optical detector by using a fiber bundle or the like that is gradually thinner. By such a configuration, in the reception device, stable fiber coupling is achieved even against a disturbance of a beam spot. Further, PTL 1 also discloses a configuration in which a core diameter is decreased to a diameter equal to that of a single mode fiber in a tapered shape, and thereby a coupled signal light is converged on a core of the single mode fiber and connection to an optical component adapted to a next-stage single mode fiber is made possible.

A communication device that constructs a free space optics system disclosed in PTL 2 (Japanese Registered Patent Publication No. 4701454) includes a light condensing unit, a fiber bundle, a plurality of optical receivers, a plurality of optical transmitters, and a transmission/reception control unit. The communication device is configured to transmit a signal light from the same position as a light condensing position of a signal light received from an opposite device. By this configuration, regardless of deflection of a light condensing system due to an atmospheric fluctuation and a peripheral temperature change, in the opposite device side, a signal light from the communication device is condensed to a signal light emission point.

NPL 1 ("Next-generation Extremely Large Optical Infrared Telescope Planning Instructions") discloses an adaptive optics (AO) technique that measures and corrects distortion of a wave-front of a signal light. In the technique, a wave-front of a reception light distorted due to an atmospheric fluctuation is observed by a wave-front sensor and a wave-front correction element using a micro electro mechanical system (MEMS) or the like is controlled by using the observation result.

CITATION LIST

Patent Literature

[PTL 1] Japanese Translation of PCT International Application Publication No. 2013-535871
[PTL 2] Japanese Registered Patent Publication No. 4701454

Non Patent Literature

[NPL 1] "Next-generation Extremely Large Optical Infrared Telescope Planning Instructions," TMT-J Project Office, National Astronomical Observatory of Japan, July 2012

SUMMARY OF INVENTION

Technical Problem

When communication is performed between a flying object in midair and a ground station, while a restriction on a power use amount is small in the ground station side since power supply is easy therein, a restriction on a power use amount is large in the flying object in midair due to being operated with power of a power storage device such as a solar power generator. Further, since an atmospheric density is low in midair, efficiency of forced air cooling is very low, and therefore it is necessary to take measures against heat generation only by natural radiation. Therefore, it is necessary for a communication device mounted on a flying object to reduce a power consumption amount and a signal processing amount related to the power consumption amount as much as possible.

Further, in the configuration disclosed in PTL 1, it is assumed that a plurality of optical detectors are used. Therefore, the configuration is applicable to communication of a signal light in which a ground station is a reception end, but it is difficult for the configuration to be applied to communication of a signal light in which a flying object is a reception end.

The configuration disclosed in PTL 2 can reduce a load on a flying object in midair by selecting an optimum state for transmitting a signal light on a ground station side. The configuration exerts, upon reception of a signal light in the ground station, an advantageous effect when a condensed beam spot is sufficiently smaller than a core diameter of each single mode fiber constituting a fiber bundle. However, in general, a beam spot is larger than a core diameter of a single mode fiber, and therefore the configuration disclosed in PTL 2 cannot sufficiently exert the advantageous effect upon reception of a signal light in the ground station.

The adaptive optics technique disclosed in NPL 1 can previously cause a transmission signal light to be subjected to reverse distortion by referring to wave-front distortion of a reception signal light. However, it is difficult for the technique to perform wave-front compensation by considering a disturbance of several kHz that is a frequency of atmospheric fluctuation variations, due to a velocity of signal processing.

The present invention has been made to solve the above-described problems. In other words, a main object of the present invention is to provide a communication technique capable of compensating a disturbance of a signal light (a beam spot) caused by an atmospheric fluctuation and the like, without increasing a consumed power amount and a heat generation amount in a communication device included in a flying object in midair.

Solution to Problem

An optical communication device recited in the present invention includes:
a transmission medium of a multimode type that transmits a reception-side signal light incident through a free space;
a reception-side distributor that distributes the reception-side signal light into a plurality of distributed reception-side signal lights at a distribution ratio, the distribution ratio being ratio depending on an intensity distribution of a plurality of mutually different propagation modes included in the reception-side signal light after passing through the transmission medium;
a transmission-side distributor that distributes a transmission-side signal light to be transmitted into a plurality of distributed transmission-side signal lights;
a signal processing device that includes a detection function and a setting function, the detection function being a function that detects either or both of a light intensity and a phase in each distributed reception-side signal light, the setting function being a function that sets a control target value for either or both of a light intensity and a phase to be controlled in each distributed transmission-side signal light to a value depending on a detection result by the detection function;
a modulator that adjusts either or both of a light intensity and a phase to be controlled in the distributed transmission-side signal light to the control target value set by the signal processing device; and
a multiplexer that multiplexes the plurality of distributed transmission-side signal lights obtained after being adjusted by the modulator.

An optical communication system recited in the present invention includes:
the optical communication device of the present invention; and
an optical communication device on a communication partner side that communicates with the optical communication device by a signal light, wherein
the optical communication device is disposed on a ground side, and
the optical communication device on the communication partner side is included in a flying object that flies in midair.

An optical communication method includes:
receiving a reception-side signal light incident through a free space by using a transmission medium of a multimode type;
distributing the reception-side signal light into a plurality of distributed reception-side signal lights at a distribution ratio, the distribution ratio being ratio depending on an intensity distribution of a plurality of mutually different propagation modes included in the reception-side signal light after passing through the transmission medium;
detecting either or both of a light intensity and a phase in each distributed reception-side signal light;
distributing a transmission-side signal light to be transmitted to a plurality of distributed transmission-side signal lights;
setting a control target value for either or both of a light intensity and a phase to be controlled in each distributed transmission-side signal light to a value depending on a result of the detecting;
adjusting either or both of a light intensity and a phase to be controlled in the distributed transmission-side signal light to the control target value after setting; and multiplexing a plurality of distributed transmission-side signal lights obtained after being adjusted and emitting a multiplexed transmission-side signal light.

Advantageous Effects of Invention

According to the present invention, a disturbance of a signal light caused by an atmospheric fluctuation and the like can be compensated without increasing a consumed power amount and a heat generation amount in a communication device included in a flying object in midair.

DESCRIPTION OF EMBODIMENTS

Example embodiments according to the present invention are described below with reference to the accompanying drawings.

First Example Embodiment

Figure 1:
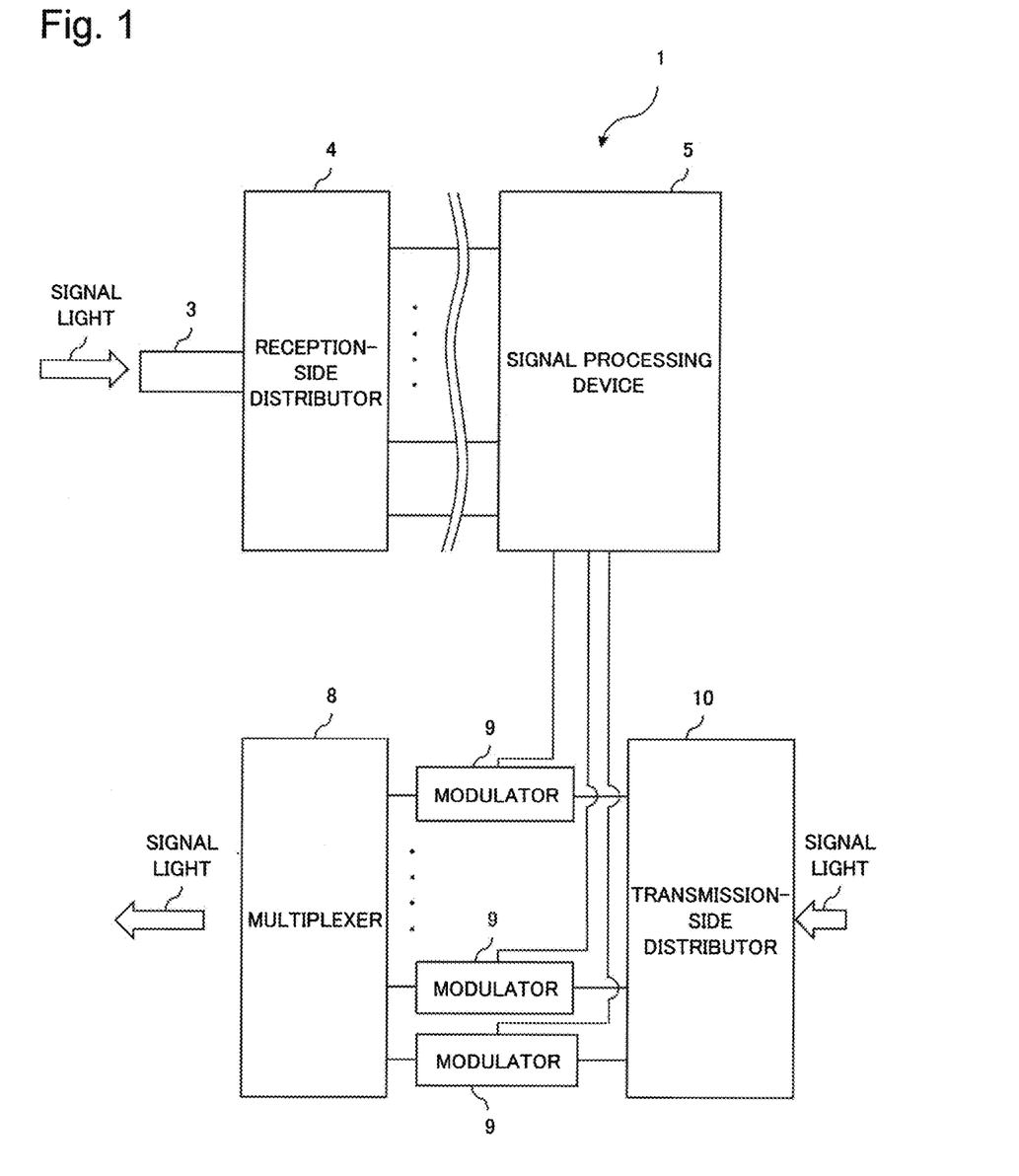
FIG. 1 is a block diagram illustrating a simplified configuration of an optical communication device of a first example embodiment according to the present invention.

FIG. 1 is a block diagram illustrating a simplified configuration of an optical communication device of a first example embodiment according to the present invention. An optical communication device 1 of the first example embodiment includes a transmission medium 3, a reception-side distributor 4, a signal processing device 5, a multiplexer 8, a modulator 9, and a transmission-side distributor 10.

The transmission medium 3 is a transmission medium (e.g. an optical fiber) of a multimode type that transmits a signal light. In the first example embodiment, the transmission medium 3 transmits a signal light (hereinafter, referred to as a reception-side signal light) that has entered the optical communication device 1 through a free space.

The reception-side distributor 4 is configured to distribute the reception-side signal light into a plurality of distributed reception-side signal lights at a distribution ratio. The distribution ratio is ratio according to an intensity distribution of mutually different propagation modes included in the reception-side signal light which has passed through the transmission medium 3.

The transmission-side distributor 10 is configured to distribute, when receiving a transmission-side signal light to be transmitted, the received transmission-side signal light into a plurality of distributed transmission-side signal lights.

The signal processing device 5 includes a function of detecting either or both of a light intensity and a phase in a distributed reception-side signal light. Further, the signal processing device 5 further includes a function of setting a control target value for either or both of a light intensity and a phase to be controlled in each distributed transmission-side signal light to a value depending on a detection result by the detection function.

The modulator 9 is configured to adjust either or both of a light intensity and a phase to be controlled in the distributed transmission-side signal light by the transmission-side distributor 10 to the control target value set by the signal processing device 5.

The multiplexer 8 is configured to multiplex a plurality of transmission-side signal lights obtained by being adjusted by the modulator 9.

A multiplexed transmission-side signal light by the multiplexer 8 is emitted into a free space toward a communication partner of the optical communication device 1.

The optical communication device 1 of the first example embodiment can emit the transmission-side signal light that makes a phase-conjugated state with the reception-side signal light by including a configuration as described above. In the transmission-side signal light (a beam spot) of such the phase-conjugated state, a disturbance due to an atmospheric fluctuation and the like in a free space is suppressed, and therefore the optical communication device 1 can reduce noise of a signal light (transmission-side signal light) received by a communication partner and can increase a light intensity. That is, the optical communication device 1 can increase, without modifying a configuration of a communication partner and a signal processing technique, the intensity of the signal light received by the communication partner. In other words, the optical communication device 1 can compensate a disturbance of the transmission-side signal light (a beam spot) due to the atmospheric fluctuation and the like without increasing a consumed power amount and a heat generation amount of the communication partner, can increase the intensity of the signal light received by the communication partner, and can reduce noise of the signal light.

Further, the optical communication device 1 of the first example embodiment is configured to transmit the reception-side signal light which has passed through a free space by using the transmission medium 3 of the multimode type. In a transmission medium of a multimode type, a core diameter through which a signal light passes is larger than a core diameter of a transmission medium of a single mode type, and therefore the reception-side signal light that has passed through a free space is made easily incident, compared with the transmission medium of the single mode type. Thereby, the optical communication device 1 can increase a reception intensity of the reception-side signal light. Further, the reception intensity of the reception-side signal light can be increased using the transmission medium 3 of the multimode type, and therefore the optical communication device 1 can obtain an advantageous effect that it is unnecessary to provide a large-size reception device or a high-sensitive, expensive reception device to increase the reception intensity.

Figure 2:
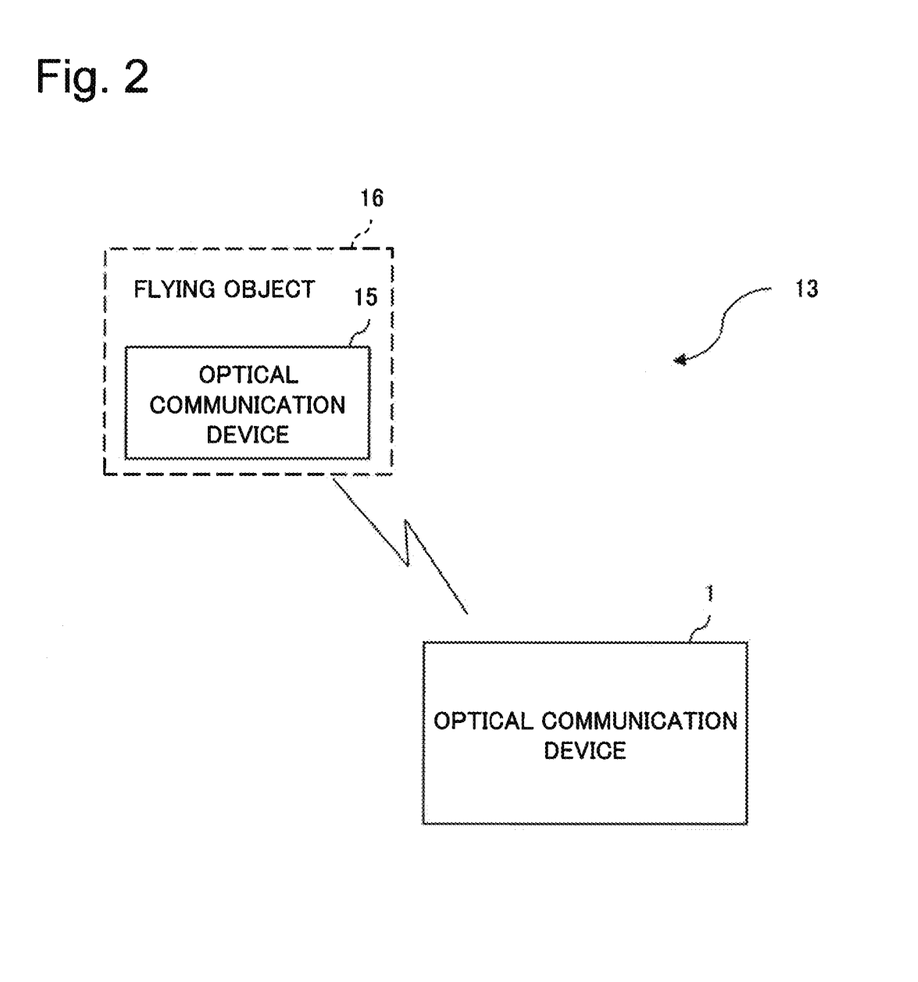
FIG. 2 is a block diagram illustrating one example of a simplified configuration of an optical communication system.

The optical communication device 1 of the first example embodiment can construct an optical communication system 13 as illustrated in FIG. 2. The optical communication system 13 includes the optical communication device 1 of the first example embodiment and an optical communication device 15 that is the communication partner of the optical communication device 1. The optical communication device 15 is mounted on a flying object (e.g. an artificial satellite or a balloon) 16. In contrast, the optical communication device 1 functions as a ground station installed on a ground side. These optical communication devices 1 and 15 are configured to wirelessly communicate a signal light. In other words, the optical communication system 13 illustrated in FIG. 2 is an FSO (free space optics) system.

The optical communication system 13 includes the optical communication device 1 of the first example embodiment and therefore can suppress the consumed power amount and the heat generation amount of the optical communication device 15 mounted on the flying object 16. Further, the optical communication system 13 can stabilize wireless communication of the signal light between the optical communication devices 1 and 15 and thereby can increase reliability for wireless communication.

Second Example Embodiment

A second example embodiment according to the present invention will be described below.

Figure 3:
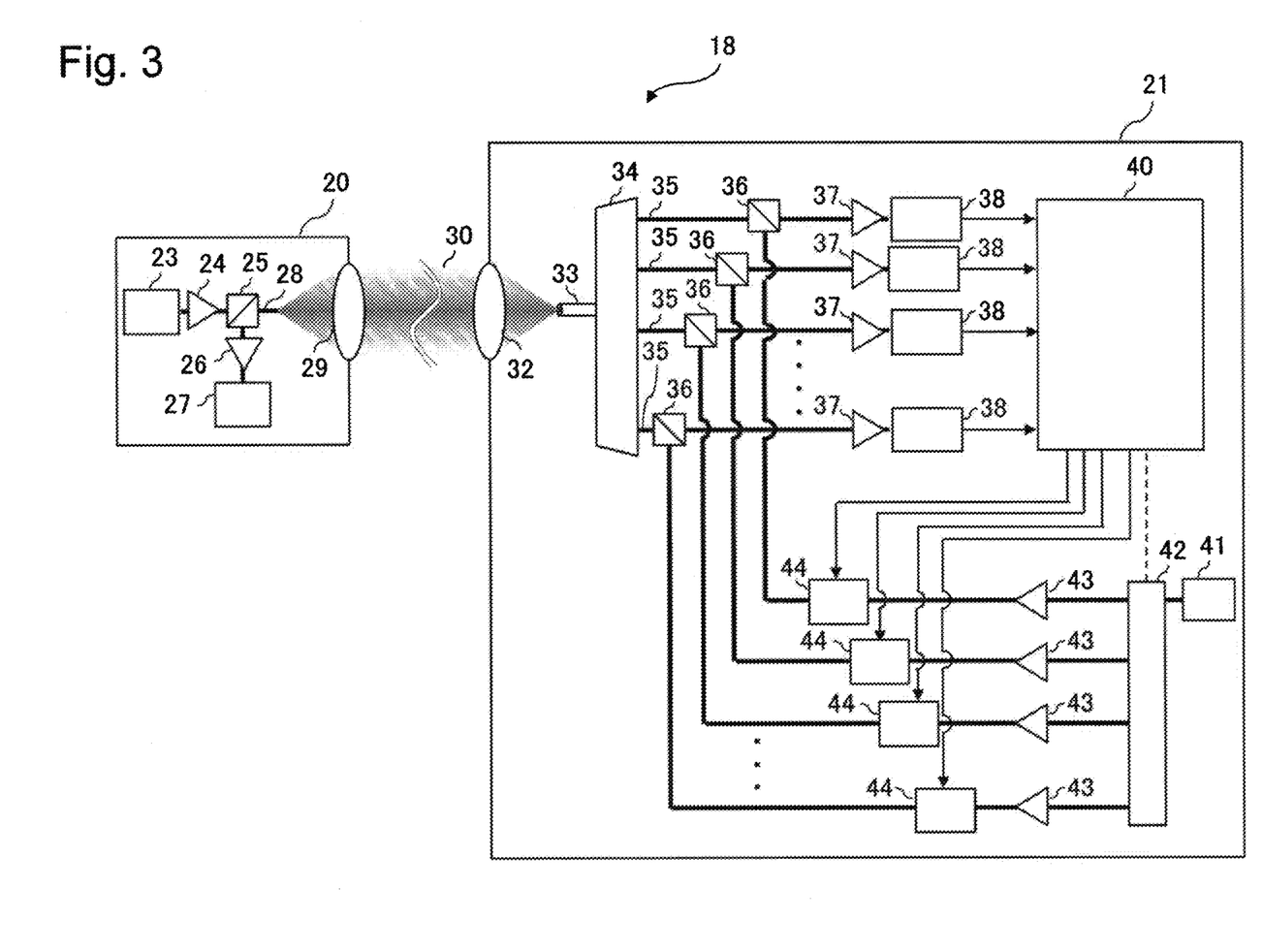
FIG. 3 is a block diagram illustrating simplified configurations of an optical communication device of a second example embodiment according to the present invention and an optical communication system including the optical communication device.

FIG. 3 is a block diagram illustrating a simplified configuration of an optical communication system including an optical communication device of the second example embodiment. An optical communication system 18 of the second example embodiment is an FSO (free space optics) system and includes optical communication devices 20 and 21 that communicate a signal light. In the second example embodiment, the optical communication device 20 is a communication device included in a flying object such as an artificial satellite and a balloon. The optical communication device 21 is a communication device which functions as a ground station installed on a ground side.

The optical communication device 20 includes an optical transmitter 23, an optical amplifier 24, a beam splitter 25, an optical amplifier 26, an optical receiver 27, a transmission medium 28, and a light condensing unit 29. The optical transmitter 23 is configured to generate a signal light to be transmitted. The optical amplifier 24 is configured to amplify the signal light generated by the optical transmitter 23. The amplified signal light to be transmitted is transmitted to the light condensing unit 29 via the beam splitter 25 and the transmission medium (e.g. an optical fiber of a single mode type) 28.

The light condensing unit 29 includes a function of converting the signal light to be transmitted emitted from the transmission medium 28 to a parallel light beam 30 and emitting (transmitting) the parallel light beam 30 into a free space toward the optical communication device 21. The optical communication device 20 is configured to control a direction of the light condensing unit 29 and the like in such a way as to transmit the parallel light beam 30 emitted from the light condensing unit 29 to the optical communication device 21 of being a ground station, through the atmosphere or the like in a free space (not illustrated).

Further, the light condensing unit 29 includes a function of condensing the parallel light beam 30 which is a reception-side signal light. This reception-side signal light is light that has passed through the free space from the optical communication device 21. In the second example embodiment, for example, a position relation between the light condensing unit 29 and an end face of the transmission medium 28 is designed in such a way that the condensed reception-side signal light enters the transmission medium 28.

The beam splitter 25 is configured to pass through the signal light to be transmitted output from the optical transmitter 23 toward the light condensing unit 29 and guide the reception-side signal light transmitted from the light condensing unit 29 to the optical receiver 27.

The amplifier 26 is configured to amplify a signal light.

The optical receiver 27 is configured to convert the signal light that has passed through the amplifier 26 to an electric signal.

The optical communication device 21 includes a light condensing unit 32, a transmission medium 33, an optical multiplexer/demultiplexer 34, a transmission medium 35, a beam splitter 36, an amplifier 37, a receiver 38, a signal processing device 40, a transmitter 41, a distributor (transmission-side distributor) 42, an amplifier 43, and a modulator 44.

The light condensing unit 32 includes a function of condensing the parallel light beam 30 of being a signal light (hereinafter, referred to also as the reception-side signal light) that has passed through a free space. The transmission medium 33 is a transmission medium (e.g. an optical fiber) of a multimode type that transmits a signal light. Herein, a position relation between the light condensing unit 32 and an end face of the transmission medium 33 is set in such a way that the reception-side signal light condensed by the light condensing unit 32 enters a core of the transmission medium 33.

The optical multiplexer/demultiplexer 34 is connected to the transmission medium 33 of the multimode type and also is connected to a plurality of transmission media 35 of the single mode type. The optical multiplexer/demultiplexer 34 includes a function of distributing the signal light (reception-side signal light) input from the transmission medium 33 to a plurality of signal lights and outputting each distributed signal light to a corresponding transmission medium 35.

In the second example embodiment, the optical multiplexer/demultiplexer 34 does not simply distribute the reception-side signal light input from the transmission medium 33, but distributes the reception-side signal light into a plurality of distributed reception-side signal lights at a distribution ratio according to an intensity distribution. This intensity distribution is distribution of a plurality of mutually different propagation modes included in the reception-side signal light. The optical multiplexer/demultiplexer 34 distributes, for example, at the distribution ratio according to an intensity distribution state of LP (linear polarization) modes (e.g. an intensity distribution state of a plurality of LP modes including an LP01 mode and an LP21 mode) in the reception-side signal light, the reception-side signal light into the plurality of distributed reception-side signal lights. The optical multiplexer/demultiplexer 34 outputs the distributed reception-side signal lights to corresponding transmission media 35, respectively. In other words, correspondence relations with mutually different propagation modes are set for the respective transmission media 35, to which reception-side signal lights having a light intensity according to the corresponding propagation mode are transmitted. In this manner, the correspondence relations with mutually different propagation modes are set for the respective transmission media 35, though in the second example embodiment, reception-side signal lights output by the optical multiplexer/demultiplexer 34 to the transmission media 35 are signal lights of the same propagation mode (e.g. the LP01 mode).

Further, the optical multiplexer/demultiplexer 34 includes a function of multiplexing signal lights (transmission-side signal lights) input from the transmission media 35 and outputting the multiplexed signal light to the transmission medium 33. In other words, in the second example embodiment, the optical multiplexer/demultiplexer 34 includes a function as a reception-side distributor and a function as a multiplexer.

A configuration of the optical multiplexer/demultiplexer 34 having such functions may employ, for example, a configuration described in following reference Literature 1 or reference Literature 2.

[Reference Literature 1] Sergio G. Leon-Saval et al., "Mode-selective photonic lanterns for space division multiplexing", Opt. Express 22, 1036 (2014)

[Reference Literature 2] Guillaume Labroille et al., "Efficient and mode selective spatial mode multiplexer based on multi-plane light conversion", arXiv:1404.6455 (2014)

The reception-side signal light output from the optical multiplexer/demultiplexer 34 to each transmission medium 35 is transmitted to the receiver 38 via the transmission medium 35 and the amplifier 37. Incidentally, in the second example embodiment, in transmission paths of the signal light ranging from the optical multiplexer/demultiplexer 34 to the amplifiers 37, the beam splitters 36 are disposed therebetween, respectively. Each beam splitter 36 is also connected to the modulator 44. The beam splitter 36 is configured to output the signal light output from the optical multiplexer/demultiplexer 34 to the transmission medium 35 toward the amplifier 37 and output the signal light input from the modulator 44 side toward the optical multiplexer/demultiplexer 34.

The amplifier 37 is configured to amplify the distributed reception-side signal light output from the optical multiplexer/demultiplexer 34. The receiver 38 is disposed correspondingly to each amplifier 37. Each receiver 38 includes a function of receiving the distributed reception-side signal light amplified by the amplifier 37 and converting the distributed reception-side signal light to an electric signal. The electric signal after the conversion is output to the signal processing device 40.

The transmitter 41 is configured to generate a signal light to be transmitted (hereinafter, referred to also as the transmission-side signal light) and output the transmission-side signal light.

The distributor (transmission-side distributor) 42 is configured to distribute the transmission-side signal light output from the transmitter 41 into a plurality of transmission-side signal lights. The number of distributed transmission-side signal lights after being distributed by the distributor 42 is the same as the number of distributed reception-side signal lights distributed by the optical multiplexer/demultiplexer 34.

Each transmission-side signal light output from the distributor 42 is transmitted to the optical multiplexer/demultiplexer 34 via the amplifiers 43, the modulators 44, and the beam splitters 36.

The amplifier 43 is configured to amplify the distributed transmission-side signal light. The modulator 44 is configured to modulate the distributed transmission-side signal light. A modulation degree and the like of the distributed transmission-side signal light by the modulator 44 is controlled by the signal processing device 40.

The signal processing device 40 includes a function of executing signal processing of the electric signal received from the receiver 38. Further, in the second example embodiment, the signal processing device 40 includes a function of using the electric signal received from each receiver 38 and detecting (calculating) a light intensity and a phase of the distributed reception-side signal light being transmitted in each transmission medium 35, via application of a digital coherent signal processing technique.

Further, based on the detected result, the signal processing device 40 includes a function of setting a modulation degree of the distributed transmission-side signal light according to each modulator 44 in such a way that the transmission-side signal light establishes a phase-conjugated relation with the reception-side signal light. In the second example embodiment, the signal processing device 40 sets a control target value of a phase to be controlled in the transmission-side signal light based on information of the phase detected from the reception-side signal light, in such a way that the transmission-side signal light is in the phase-conjugated state with the reception-side signal light. The control target value is transmitted from the signal processing device 40 to the corresponding modulator 44, and the modulator 44 modulates the distributed transmission-side signal light based on the control target value.

The transmission-side signal lights output from the respective modulators 44 are transmitted to the optical multiplexer/demultiplexer 34 via the beam splitters 36 and are multiplexed by the optical multiplexer/demultiplexer 34. The multiplexed transmission-side signal light is emitted in the free space toward the optical communication device 20 through the transmission medium 33 and the light condensing unit 32. In the second example embodiment, the emitted transmission-side signal light reaches the phase-conjugated state with the reception-side signal light.

The optical communication device 21 in the second example embodiment is configured as described above. Thereby, the following advantageous effect can be obtained. That is, the optical communication device 21 in the second example embodiment can emit the transmission-side signal light phase-conjugated with the received signal light (reception-side signal light) toward the communication partner. Thereby, the communication partner (i.e. the optical communication device 20 mounted on the flying object) of the optical communication device 21 can receive the signal light in which an adverse effect due to the atmospheric fluctuation and the like between the optical communication devices 20 and 21 is reduced. Therefore, since the optical communication device 20 can receive the reception signal light having a strong light intensity, an advantageous effect that it is unnecessary to provide a reception device having a large power consumption amount and a large heat generation amount such as when the reception signal light is weak can be obtained.

Further, the optical communication device 21 can emit the transmission-side signal light phase-conjugated with the reception-side signal light toward the communication partner as described above.

Thereby, in the optical communication device 20 of being the communication partner, the signal light from the optical communication device 21 can stably enter the transmission medium 28 even when the transmission medium 28 is the optical fiber of the single mode type. In other words, the optical communication device 21 can stabilize coupling efficiency of the signal light between the light condensing unit 29 in the optical communication device 20 that is the communication partner and the transmission medium 28 of the single mode type.

Figure 4:
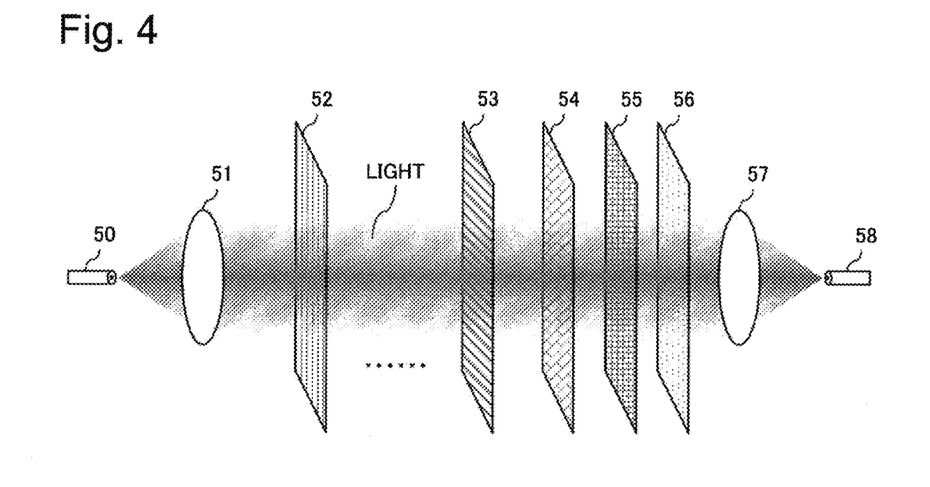
FIG. 4 is a diagram illustrating a path model of a signal light used in a simulation made by the present inventors.

The present inventors have confirmed such the advantageous effect by a simulation. FIG. 4 is a diagram illustrating a path model of a signal light assumed in the simulation. The model is applied with a transmission model described in reference Literature 3.

[Reference Literature 3] Takahashi et al., "A Study of an SDM-type Optical Space Receiver (1) An improvement of Coupling Efficiency by FMF", The Institute of Electronics, Information and Communication Engineers General Conference 2015, B-3-23 (2015)

In the model illustrated in FIG. 4, it is assumed that a signal light of a linear polarization LP01 mode is emitted from an optical fiber 50 of the single mode type toward a light condensing unit 51. The light condensing unit 51 is, for example, a spherical lens of a diameter of one meter, and it is assumed herein that a signal light emitted from the light condensing unit 51 is an ideal parallel light. It is assumed that the signal light (parallel light) according to the light condensing unit 51 is vertically propagated from an altitude of 50 kilometers that is an existence limit of the atmosphere toward a light condensing unit 57 on the ground. In this model, in order to obtain, in a limited space, a signal light similar to a signal light upon being vertically propagated from the altitude of 50 kilometers to the ground, in a path of the signal light between the light condensing units 51 and 57, random phase screens 52, 53, 54, 55, and 56 that imitate the atmosphere are inserted between the units. The random phase screens 52 to 56 provide a fluctuation similar to a fluctuation due to the atmosphere to the signal light. It is assumed that the fluctuation is a fluctuation determined by a refractive index structure parameter Cn2 described in reference Literature 4. Further, in the simulation, assuming that a wind of an average wind velocity of 10 m/s blows in the atmosphere, the random phase screens 52 to 56 are moved.

[Reference Literature 4] Toyoshima et al., "Laser Beam Atmospheric Propagation Characteristics in an Optical Communication Channel between the Ground and a Low Orbit Satellite", IEICE Transactions on Communications B, Vol. J94-B, No. 3, P. 409 (2011)

Assuming that the light condensing unit 57 is a light condensing unit similar to the light condensing unit 51, the light condensing unit 57 condenses an incident signal light (parallel light) on a focal position. An end face of an optical fiber 58 is positioned at the focal position, and a signal light emitted from the light condensing unit 57 enters the optical fiber 58. Note that it is assumed that a signal light propagated in a direction from the light condensing unit 51 toward the light condensing unit 57 is referred to as a downlink signal light and a signal light propagated in a reverse direction (a direction from the light condensing unit 57 toward the light condensing unit 51) is referred to as an uplink signal light.

In the simulation, the downlink signal light that has entered the optical fiber 58 is distributed into 21 different linear polarization modes, and a phase and an intensity in each distributed signal light are calculated.

Thereafter, the uplink signal light propagated from the light condensing unit 57 toward the light condensing unit 51 is generated. The uplink signal light is a signal light obtained by multiplexing 21 linear polarization modes and an intensity thereof is 1 milliwatt each. Further, the phase of the uplink signal light is controlled based on information of the intensity and the phase of the downlink signal light obtained by the simulation in such a way as to be multiplexed in the phase-conjugated state with the downlink signal light.

Such the uplink signal light is emitted from the optical fiber 58, propagated by a path of a direction opposite to that of the downlink signal light in the phase-conjugated state with the downlink signal light, and enters the optical fiber 50.

Figure 5:
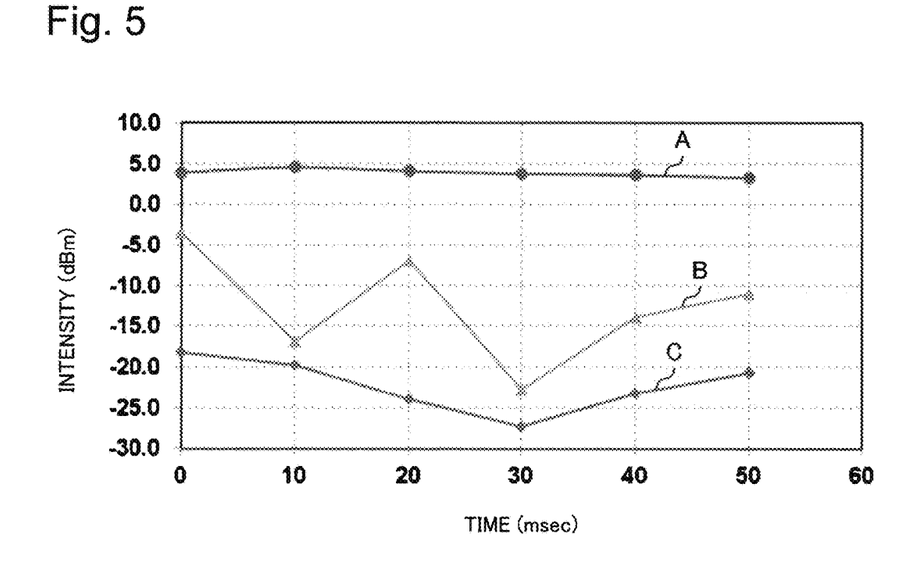
FIG. 5 is a graph illustrating results of the simulation made by the present inventors.

In the simulation, for the signal light of the linear polarization LP01 mode in the signal light that has entered the optical fiber 50, the intensity of the reception signal light is calculated every 10 milliseconds during a period of 50 milliseconds. FIG. 5 is a graph illustrating calculation results obtained by the simulation. The horizontal axis of the graph represents time, and the vertical axis represents an intensity (reception intensity) of a signal light of a linear polarization LP01 mode that has entered the optical fiber 50. Further, a circle mark (●) in the graph represents a calculation result of a reception intensity of the uplink signal light when the uplink signal light obtained by multiplexing 21 linear polarization modes is propagated in the phase-conjugated state with the downlink signal light. A solid line A is a line obtained by connecting circle marks. A triangle mark (▲) in the graph represents a calculation result of a reception intensity of the uplink signal light when the uplink signal light obtained by multiplexing 21 linear polarization modes is propagated in a simply multiplexed state (phase-unconjugated state). A solid line B is a line obtained by connecting triangle marks. A rhombus mark (♦) in the graph represents a calculation result of a reception intensity of the uplink signal light when the uplink signal light is a signal light of an LP01 mode. A solid line C is a line obtained by connecting rhombus marks.

In the simulation, the optical fiber 50 side is equivalent to the optical communication device 20 side mounted on the flying object such as an artificial satellite, and the optical fiber 58 side is equivalent to the optical communication device 21 side in the second example embodiment. Further, the reception intensity of the signal light in the optical fiber 50 calculated by the simulation can be regarded as the reception intensity of the signal light received by the optical communication device 20. As illustrated in the simulation result (see the solid line A), as in the second example embodiment, the signal light (uplink signal light) emitted from the optical fiber 58 is propagated in the phase-conjugated state with the downlink signal light, and thereby the reception intensity is stabilized. In contrast, when the uplink signal is simply multiplexed with the downlink signal light (see the solid line B), it is understood that the reception intensity varies unstably. Further, when the uplink signal is the signal light of the linear polarization LP01 mode (see the solid line C), the reception intensity is weak and in addition, varies.

That is, the optical communication device 21 of the second example embodiment transmits the signal light in the phase-conjugated state with the signal light received from the communication partner toward the communication partner and thereby can increase the intensity of the reception signal light in the optical communication device 20 of being the communication partner. Thereby, it is unnecessary for the optical communication device 20 of being the communication partner to include a large-sized, accurate, and expensive reception device, and therefore the consumed power amount and the heat generation amount for reception of the signal light can be reduced.

Further, the optical communication device 21 of the second example embodiment includes the transmission medium (optical fiber) of the multimode type as the transmission medium 33 that receives light from the light condensing unit 32. A multimode optical fiber is larger than the single mode optical fiber in the diameter of the core that propagates the signal light, and therefore compared with a case where the transmission medium 33 is the single mode optical fiber, the optical communication device 21 can increase the reception intensity of the signal light.

In the second example embodiment, the signal processing device 40 detects the phase of the reception-side signal light and sets the control target value for the phase of the transmission-side signal light based on the detection result. Instead of this, the signal processing device 40 may set the control target value for the phase of the transmission-side signal light not by considering only the detection result of the phase of the reception-side signal light but by considering the detection result and a phase rotation by an SPM (self phase modulation) in the amplifier 37. In other words, a signal light intensity of each propagation mode included in the reception-side signal light is likely to vary, and therefore SPM of the amplifier 37 in which the signal light intensity is involved to a large extent also varies. In order to suppress the influence of the variation, the signal processing device 40 may calculate a phase rotation amount in each amplifier 37 and set the control target value of the phase to be controlled in the transmission-side signal light by considering the calculation value.

Further, in the second example embodiment, the path of the reception-side signal light from the beam splitter 36 to the receiver 38 and the path of the transmission-side signal light from the transmitter 41 to the beam splitter 36 are separate. Therefore, due to a change of an optical path length resulting from a change of an environmental temperature, a relative phase of the signal light corresponding to each propagation mode changes. When such the relative phase change occurs, the phase-conjugated state between the transmission-side signal light and the reception-side signal light collapses, and thereby the intensity of the signal light that enters the transmission medium 28 in the optical communication device 20 of the flying object may degrade. Considering this matter, in the optical communication device 21, in a portion where the path through which the reception-side signal light passes and the path through which the transmission-side signal light passes are separate, an optical path in which an influence of a temperature change is small is employable. As such the optical path, for example, a PLC (planar lightwave circuit) is employable.

Third Example Embodiment

A third example embodiment according to the present invention will be described below. In description of the third example embodiment, a portion of the same name as for a configuration portion configuring the communication system of the second example embodiment is assigned with the same reference sign, and overlapping description of the common portion will be omitted.

While the modulator 44 of the optical communication device 21 in the second example embodiment is configured to control the phase of the transmission-side signal light, in the third example embodiment, as the modulator 44, a modulator capable of adjusting both the phase and the light intensity of the transmission-side signal light is employed. As such the modulator capable of adjusting both the phase and the light intensity of the signal light, for example, there is a Mach-Zehnder-type modulator, and the modulator is controlled as described in reference Literature 5.

[Reference Literature 5] U.S. Pat. No. 7,023,601

In the third example embodiment, both the phase and the light intensity in the transmission-side signal light are control subjects, and the signal processing device 40 includes a function of setting control target values of both the phase and the light intensity. The signal processing device 40 sets, for example, the control target value of the light intensity in the transmission-side signal light as described below. Herein the light intensity of the propagation mode n in the signal light is designated as $P_n$ (n=1, 2, . . . ), and the control target value in the light intensity of the propagation mode n is designated as $Q_n$ (n=1, 2, . . . ). The signal processing device 40 sets the control target value $Q_n$ in such a way as to satisfy a relation as represented in equation (1).

$$P_1:P_2:P_3 \ldots = Q_1:Q_2:Q_3 \ldots \qquad (1)$$

The modulator 44 adjusts the phase and the light intensity of the distributed transmission-side signal light in such a way as to be the control target values set by the signal processing device 40.

Configurations of the optical communication device 21 except for the above and the optical communication system including the device are similar to the configurations described in the second example embodiment.

The optical communication device 21 of the third example embodiment and the optical communication system including the device include configurations similar to those of the second example embodiment and therefore can obtain advantageous effects similar to those of the second example embodiment. Further, the optical communication device 21 of the third example embodiment adjusts not only the phase of the transmission-side signal light but also the light intensity thereof and thereby makes the phase-conjugated state between the transmission-side signal light and the reception-side signal light. Thereby, the optical communication device 21 of the third example embodiment can provide the signal light having the stronger light intensity toward the optical communication device 20 of being a communication partner. This matter has been confirmed using a simulation by the present inventors.

Figure 6:
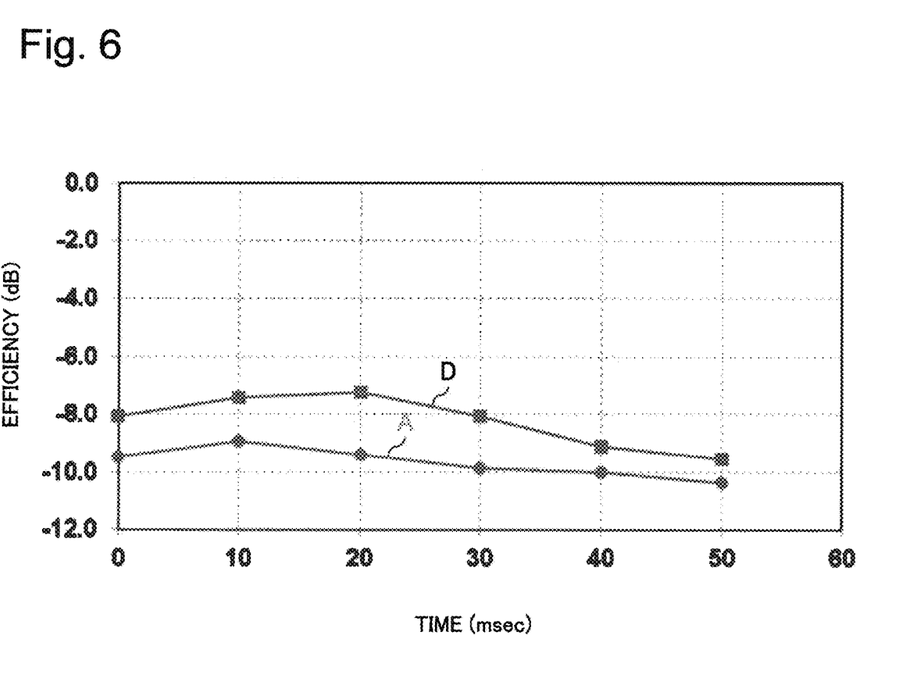
FIG. 6 is a graph illustrating results of another simulation made by the present inventors.

In the simulation, the model (see FIG. 4) of the path of the signal light used in the simulation described in the second example embodiment is used. In this model, a condition has been set in such a way that the intensity distributions (intensity ratios) between the propagation modes in the downlink signal light and the uplink signal light are similar. Based on such the condition, the reception intensity of the uplink signal light that enters the optical fiber 50 of the single mode type has been calculated. Further, the ratio of the intensity of the uplink signal light at an incident point where the signal light entered the optical fiber 50 to the intensity of the uplink signal light at an emission point where the signal light has been emitted from the optical fiber 58 has been calculated as an efficiency. FIG. 6 is a graph illustrating the calculation results. In FIG. 6, the vertical axis represents the efficiency and the horizontal axis represents a time. A circle mark (●) in the graph represents a calculation result when the intensity distribution of the propagation modes in the uplink signal light obtained by multiplexing 21 linear polarization modes is uniform, differently from the downlink signal light at a reception point of time, and the uplink signal light is in the phase-conjugated state with the downlink signal light at the reception point of time. A solid line A is a line obtained by connecting circle marks. A square mark (■) in the graph represents a calculation result when the intensity distribution of the propagation modes in the uplink signal light obtained by multiplexing 21 linear polarization modes is similar to that of the downlink signal light at a reception point of time, and in which the uplink signal light is in the phase-conjugated state with the downlink signal light at the reception point of time. A solid line D is a line obtained by connecting square marks.

In the simulation, as described above, the optical fiber 50 side is equivalent to the optical communication device 20 side mounted on the flying object such as an artificial satellite, and the optical fiber 58 side is equivalent to the optical communication device 21 side in the third example embodiment. Further, the reception intensity of the signal light in the optical fiber 50 calculated by the simulation can be regarded as the reception intensity of the signal light received by the optical communication device 20. The intensity of the signal light emitted from the optical fiber 58 can be regarded as the intensity of the signal light transmitted from the optical communication device 21. As illustrated in FIG. 6, when the intensity distribution of propagation modes in the uplink signal light is similar to that of the downlink signal light (see the solid line D), an efficiency increases by approximately 0.8 to 2.2 dB, compared with a case of being different (see the solid line A). In other words, when the configuration of the optical communication device 21 in the third example embodiment is provided, the optical communication device 21 can increase the intensity of the signal light received by the optical communication device 20 even when the intensity of the signal light to be emitted is the same.

In some case, the intensity of the signal light emitted from the optical communication device 21 is restricted. For example, a power on light input to the light condensing unit 32 is restricted. The reason for such power restriction on the input light is as follows. The light condensing unit 32 includes, for example, a lens and a mirror. When, for example, a strong signal light of several watts enters the light condensing unit 32, the lens and the mirror generate heat and thereby distortion may be generated due to the heat. Thereby, an optical-system alignment is shifted, which becomes a cause of a decrease in accuracy of directionality of the signal light. Therefore, a power of light that enters the light condensing unit 32 is restricted in some cases.

The optical communication device 21 of the third example embodiment can increase the intensity of the signal light received by the optical communication device 20 even when the intensity of the signal light to be emitted is restricted (limited) as described above, and therefore the advantageous effect is exerted specifically when the intensity of the signal light to be emitted is restricted.

Note that, in the third example embodiment, the modulator 44 is configured to adjust the intensity and the phase of the transmission-side signal light. In contrast, instead of such the modulator 44 that adjusts the intensity and the phase of the transmission-side signal light, for example, the intensity controller that controls the intensity of the transmission-side signal light and the phase controller that controls the phase of the transmission-side signal light may be separately disposed.

Further, instead of adjusting the light intensity using the modulator 44, the distribution ratio of the transmission-side signal lights according to the distributor 42 may be dynamically controlled. For example, the distributor 42 may be configured to distribute the transmission-side signal light in such a way that the intensity distribution (distribution ratio) of the distributed transmission-side signal lights is similar to the intensity distribution (distribution ratio) of the propagation modes (e.g. LP modes) included in the reception-side signal light that has entered the transmission medium 33. In other words, the distributor 42 may be configured to distribute the transmission-side signal light in such a way that the intensity ratio (distribution ratio) of the transmission-side signal lights among the transmission media 35 is similar to the distribution ratio (intensity ratio) of the reception-side signal lights among the transmission media 35 output from the optical multiplexer/demultiplexer 34. Note that, information of the distribution ratio of the reception-side signal light output from the optical multiplexer/demultiplexer 34 is supplied from the signal processing device 40.

Further, in the third example embodiment, the optical communication device 21 adjusts (sets) the intensity distribution of the propagation modes in the transmission-side signal light, based on the intensity distribution of the propagation modes in the reception-side signal light received from the communication partner. In contrast, the optical communication device 21 may be configured to adjust the intensity distribution of the propagation modes in the transmission-side signal light, for example, by considering a signal loss generated from the distributor 42 to the light condensing unit 32, in addition to the intensity distribution of the propagation modes in the reception-side signal light. In other words, in the signal light, the signal loss is generated in the optical multiplexer/demultiplexer 34, the transmission medium 33, and the like, and the signal loss amount differs depending on the propagation mode. Considering such an MDL (mode dependent loss), the transmission-side distributor 42 in the optical communication device 21 may be configured to adjust the intensity distribution of the propagation modes in the transmission-side signal light.

Further, in the third example embodiment, a plurality of amplifiers 43 is disposed. In contrast, for space reduction and cost reduction, it is possible that these amplifiers 43 are omitted and for the transmission medium 33 of a multimode type, the multimode optical amplifier may be inserted. The multimode optical amplifier includes, for example, an amplifier as described in reference Literature 6.

[Reference Literature 6] Y. Jung et al., "Reconfigurable modal gain control of a few-mode EDFA supporting 6 spatial modes", IEEE Photon. Tech. Lett. 26, 1100-1103 (2014)

When the multimode amplifier as described above is used, the intensity of the signal light emitted from the optical communication device 21 according to performance of the amplifier is limited. Even in such the case, the optical communication device 21 of the third example embodiment can suppress a decrease in the intensity of the signal light received in the optical communication device 20.

Fourth Example Embodiment

A fourth example embodiment according to the present invention will be described below. Note that, in description of the fourth example embodiment, a portion of the same name as a configuration portion configuring the optical communication devices and the communication systems of the second and third example embodiments is assigned with the same reference sign, and overlapping description of the common portion will be omitted.

Figure 7:
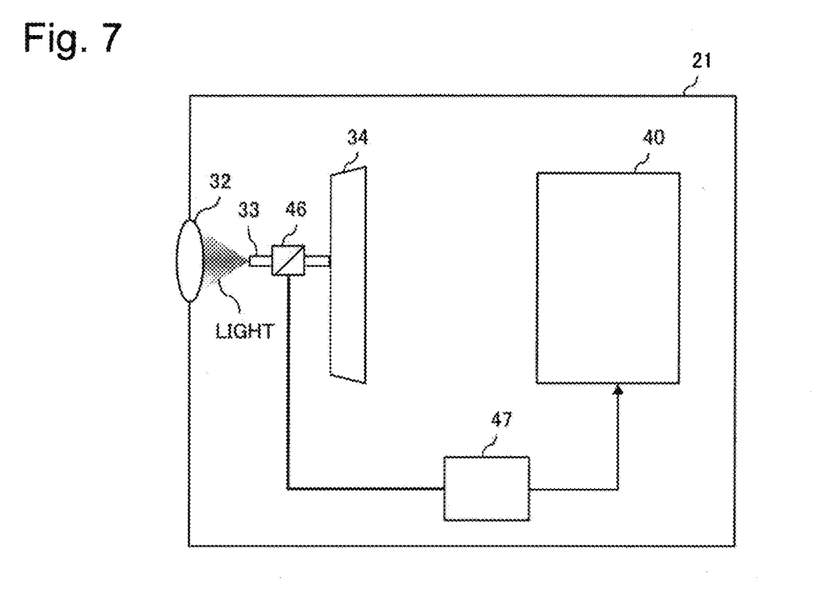
FIG. 7 is a diagram illustrating a configuration of an optical communication device of a fourth example embodiment according to the present invention.

FIG. 7 is a diagram in which in the optical communication device 21 in the fourth example embodiment, a configuration portion different from that of the optical communication device 21 in the second example embodiment or the third example embodiment and a related portion thereof are extracted and illustrated. In the fourth example embodiment, the optical communication device 21 includes a beam splitter 46 and a monitoring device 47, in addition to the configuration of the second example embodiment or the third example embodiment. The beam splitter 46 is inserted for the transmission medium 33 and is configured to split a part of the transmission-side signal light (i.e. a multiplexed transmission-side signal light) being transmitted to the transmission medium 33 and output the split signal light toward the monitoring device 47.

Figure 8:
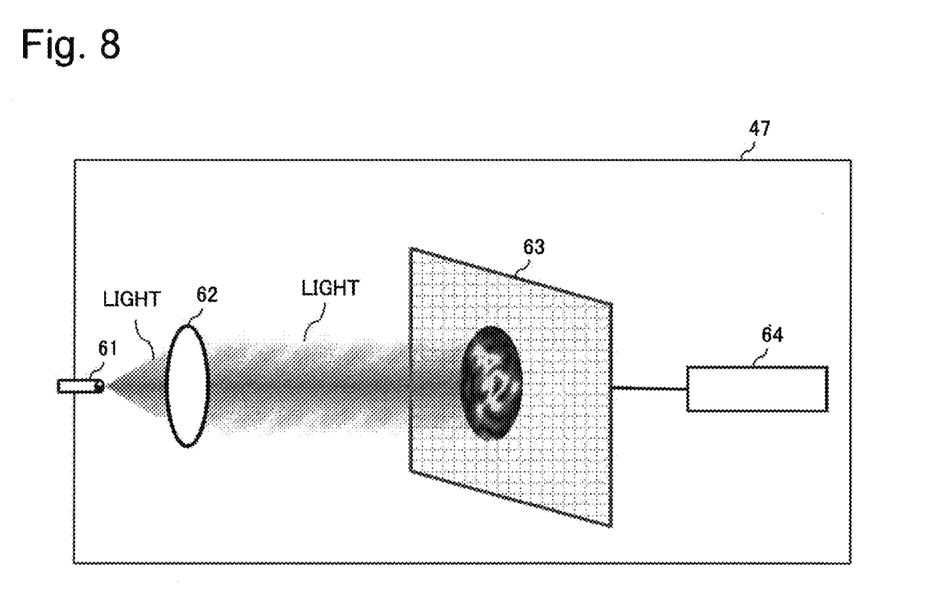
FIG. 8 is a diagram illustrating a configuration example of a monitoring device included in the optical communication device of the fourth example embodiment.

The monitoring device 47 is configured to monitor the transmission-side signal light and output the monitoring result to the signal processing device 40. FIG. 8 is a diagram illustrating one specific configuration example of the monitoring device 47. The monitoring device 47 illustrated in FIG. 8 includes a light condensing unit 62, a wave-front sensor 63, and a control unit 64. In the example of FIG. 8, the transmission-side signal light transmitted from the beam splitter 46 to the monitoring device 47 is emitted from a transmission medium 61 toward the light condensing unit 62. The light condensing unit 62 includes a function of converting a signal light incident from the transmission medium 61 to a parallel light beam. The wave-front sensor 63 is configured to receive the parallel light beam and output an electric signal according to the received light. The control unit 64 includes a function of analyzing the electric signal output from the wave-front sensor 63 and detecting (monitoring) a wave-front state (e.g. a light intensity and a phase) of the signal light that has entered the light condensing unit 62.

The wave-front sensor 63 configuring the monitoring device 47 as illustrated in FIG. 8 can use, for example, a Shack-Hartmann-type wave-front sensor as described in reference Literature 7.

[Reference Literature 7] R. G. Lane et al., "Wave-front reconstruction using a Shack-Hartmann sensor", Applied Optics, Vol. 31, Issue 32, pp. 6902-6908 (1992)

In the fourth example embodiment, the signal processing device 40 includes a function of calculating a correlation degree between the transmission-side signal light of a target calculated by information of the reception-side signal light and the transmission-side signal light according to a detection (monitoring) result of the monitoring device 47. The signal processing device 40 includes a function of using the calculation result and controlling the modulator 44 in such a way that the transmission-side signal light to be emitted is the targeted transmission-side signal light. In other words, the signal processing device 40 includes a function of feedback-controlling the modulator 44.

The optical communication device 21 of the fourth example embodiment includes a configuration similar to that of the optical communication device 21 of the second example embodiment or the third example embodiment and therefore can obtain an advantageous effect similar to that of the second example embodiment or the third example embodiment. In addition, the optical communication device 21 of the fourth example embodiment is configured to monitor the phase and the like of the transmission-side signal light to be emitted and feedback-control the modulator 44 by using the monitoring result. Thereby, the optical communication device 21 can output the transmission-side signal light that is more accurately in the phase-conjugated state with the reception-side signal light and can communicate the signal light having the strong light intensity and small noise to the optical communication device 20 that is the communication partner.

In other words, the amplifier 43 and the modulator 44 may be subjected to an adverse effect caused by an environmental temperature, power source noise, and the like, and an unnecessary fluctuation may occur in the transmission-side signal light to be output therefrom. In contrast, the optical communication device 21 of the fourth example embodiment detects such the transmission-side signal light and feedback-controls the modulator 44 by using the detection result, and therefore can compensate such a fluctuation of the transmission-side signal light.

Other Example Embodiments

Note that, the present invention is not limited to the first to fourth example embodiments and may employ various example embodiments. In the fourth example embodiment, for example, the monitoring device 47 includes the wave-front sensor 63. Instead of this, the monitoring device may include a reception system similar to the optical multiplexer/demultiplexer 34, the amplifier 37, and the receiver 38 and may be configured to feedback a part of the transmission-side signal light to the signal processing device 40 by using a path of the signal light of the reception system.

Further, in the first to fourth example embodiments, examples in which the communication partner of the optical communication devices 1 and 21 is the optical communication device mounted on a flying object are described. However, the communication partner of the optical communication devices 1 and 21 is not limited to the optical communication device mounted on the flying object when being the optical communication device capable of wirelessly communicating the signal light. However, the present invention can further exert an advantageous effect thereof when applied to the optical communication device that wirelessly transmits the signal light toward the communication device having strict limitations on consumed power and the heat generation amount.

Further, in the second to fourth example embodiments, the signal processing device 40 sets the control target value for either or both of the light intensity and the phase of the transmission-side signal light in such a way that the transmission-side signal light is in the phase-conjugated state with the reception-side signal light. In contrast, the signal processing device 40 may set the control target value for either or both of the light intensity and the phase of the transmission-side signal light in such a way that the transmission-side signal light is in a state of a purpose other than the phase-conjugated state with the reception-side signal light (e.g. in a state where the phase-conjugated state is slightly adjusted by introducing a prediction technique or the like).

As described above, the present invention has been described using the above-described example embodiments as typical examples. However, the present invention is not limited to the above-described example embodiments. In other words, the present invention is applicable with various aspects understood by those skilled in the art without departing from the scope of the present invention.

This application is based upon and claims the benefit of priority from Japanese patent application No. 2015-142769, filed on Jul. 17, 2015, the disclosure of which is incorporated herein in its entirety by reference.

REFERENCE SIGNS LIST

1, 21 Optical communication device
3, 33 Transmission medium
4 Reception-side distributor
5, 40 Signal processing device
8 Multiplexer
9, 44 Modulator
10 Transmission-side distributor
13, 18 Optical communication system
34 Optical multiplexer/demultiplexer
38 Receiver 41 Transmitter
42 Distributor

The invention claimed is:

1. An optical communication device comprising:
a transmission medium of a multimode type that transmits a reception-side signal light incident through a free space;
a reception-side multimode demultiplexer that distributes the reception-side signal light into a plurality of distributed reception-side signal lights at a distribution ratio, the distribution ratio being ratio depending on an intensity distribution of a plurality of mutually different propagation modes included in the reception-side signal light which has passed through the transmission medium;
a transmission-side demultiplexer that distributes a transmission-side signal light to be transmitted into a plurality of distributed transmission-side signal lights;
a signal processing device that includes a detection function and a setting function, the detection function being a function that detects either or both of a light intensity and a phase in each distributed reception-side signal light, the setting function being a function that sets a control target value for either or both of a light intensity and a phase to be controlled in each distributed transmission-side signal light to a value depending on a detection result by the detection function;
a modulator that adjusts either or both of a light intensity and a phase to be controlled in the distributed transmission-side signal light to the control target value set by the signal processing device; and
a multimode multiplexer that multiplexes the plurality of distributed transmission-side signal lights obtained after being adjusted by the modulator.

2. The optical communication device according to claim 1, wherein the signal processing device sets the control target value in such a way as to cause the distributed transmission-side signal light to be in a phase-conjugated state with the reception-side signal light.

3. The optical communication device according to claim 1, wherein the signal processing device detects either or both of the light intensity and the phase to be controlled in the transmission-side signal light multiplexed by the multimode multiplexer and, considering also a detection result, sets the control target value.

4. The optical communication device according to claim 1, further comprising an amplifier that amplifies the multiplexed transmission-side signal light after being multiplexed by the multimode multiplexer.

5. The optical communication device according to claim 1 further comprising an amplifier that amplifies the distributed transmission-side signal light after being distributed by the transmission-side demultiplexer.

6. The optical communication device according to claim 1 comprising a optical multiplexer/demultiplexer that includes a function of both the reception-side multimode demultiplexer and the multimode multiplexer.

7. An optical communication system comprising:
an optical communication device that is disposed on a ground side; and
an optical communication device on a communication partner side that is included in a flying object that flies in midair and communicates with the optical communication device by a signal light, wherein
the optical communication device includes:
a transmission medium of a multimode type that transmits a reception-side signal light incident through a free space;
a reception-side demultiplexer that distributes the reception-side signal light into a plurality of distributed reception-side signal lights at a distribution ratio, the distribution ratio being ratio depending on an intensity distribution of a plurality of mutually different propagation modes included in the reception-side signal light which has passed through the transmission medium;
a transmission-side multimode demultiplexer that distributes a transmission-side signal light to be transmitted into a plurality of distributed transmission-side signal lights;
a signal processing device that includes a detection function and a setting function, the detection function being a function that detects either or both of a light intensity and a phase in each distributed reception-side signal light, the setting function being a function that sets a control target value for either or both of a light intensity and a phase to be controlled in each distributed transmission-side signal light to a value depending on a detection result by the detection function;
a modulator that adjusts either or both of a light intensity and a phase to be controlled in the distributed transmission-side signal light to the control target value set by the signal processing device; and
a multimode multiplexer that multiplexes the plurality of distributed transmission-side signal lights obtained after being adjusted by the modulator.

8. An optical communication method comprising:
receiving a reception-side signal light incident through a free space by using a transmission medium of a multimode type;
multi-mode demultiplexing the reception-side signal light into a plurality of distributed reception-side signal lights at a distribution ratio, the distribution ratio being ratio depending on an intensity distribution of a plurality of mutually different propagation modes included in the reception-side signal light after passing through the transmission medium;
detecting either or both of a light intensity and a phase in each distributed reception-side signal light;
demultiplexing a transmission-side signal light to be transmitted to a plurality of distributed transmission-side signal lights;
setting a control target value for either or both of a light intensity and a phase to be controlled in each distributed transmission-side signal light to a value depending on a result of the detecting;
adjusting either or both of a light intensity and a phase to be controlled in the distributed transmission-side signal light to the control target value after setting; and
multi-mode multiplexing a plurality of distributed transmission-side signal lights obtained after being adjusted and emitting a multiplexed transmission-side signal light.

* * * * *